United States Patent
Tiwari et al.

(10) Patent No.: US 11,457,336 B2
(45) Date of Patent: Sep. 27, 2022

(54) PROCEDURE TO DELIVER SMS TO MOBILE DEVICE

(71) Applicant: NEC Corporation, Tokyo (JP)

(72) Inventors: Kundan Tiwari, Tamil Nadu (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/055,636

(22) PCT Filed: Mar. 8, 2019

(86) PCT No.: PCT/JP2019/009382
§ 371 (c)(1),
(2) Date: Nov. 16, 2020

(87) PCT Pub. No.: WO2019/220750
PCT Pub. Date: Nov. 21, 2019

(65) Prior Publication Data
US 2021/0258745 A1    Aug. 19, 2021

(30) Foreign Application Priority Data

May 18, 2018  (IN) .............................. 201811018749

(51) Int. Cl.
*H04W 4/14*        (2009.01)
*H04W 8/02*        (2009.01)
*H04W 76/16*       (2018.01)
*H04W 88/06*       (2009.01)

(52) U.S. Cl.
CPC .............. *H04W 4/14* (2013.01); *H04W 8/02* (2013.01); *H04W 76/16* (2018.02); *H04W 88/06* (2013.01)

(58) Field of Classification Search
CPC ..... H04W 48/18; H04W 76/20; H04W 88/06; H04W 76/12; H04W 4/14; H04W 8/02; H04W 76/16
See application file for complete search history.

(56) References Cited

U.S. PATENT DOCUMENTS

| | | | |
|---|---|---|---|
| 2013/0324170 A1* | 12/2013 | Watfa | H04W 4/14 455/466 |
| 2020/0045753 A1* | 2/2020 | Dao | H04W 76/10 |
| 2020/0177333 A1* | 6/2020 | Liu | H04L 5/0044 |

FOREIGN PATENT DOCUMENTS

| | | | | |
|---|---|---|---|---|
| WO | WO-2019031434 A1 * | 2/2019 | ............ | H04W 76/12 |
| WO | WO-2019098389 A1 * | 5/2019 | ............ | H04W 76/18 |
| WO | WO-2020071536 A1 * | 4/2020 | ............ | H04W 48/02 |

OTHER PUBLICATIONS

3GPP TS 23.502, 3rd Generation Partnership Project; Technical Specification Group Services and System Aspects; Procedures for the 5G System; Stage 2 Release 15 v15.1.0, Mar. 2018 (Year: 2018).*

"Enhancement of the definition of a "Subscriber"", SA1 (Siemens AG), TR 21.905, TSG-SA WG1 #17, S1-021715, Aug. 12-16, 2002, pp. 1-3, Durango, USA.

(Continued)

*Primary Examiner* — Matthew C Sams
(74) *Attorney, Agent, or Firm* — Sughrue Mion, PLLC

(57) ABSTRACT

This disclosure is related to a procedure of selecting an access stratum to send MT SMS when the UE (100) is registered to the core network via more than one access network.

4 Claims, 5 Drawing Sheets

(56) References Cited

OTHER PUBLICATIONS

"3rd Generation Partnership Project; Technical Specification Group Core Network and Terminals; Non-Access-Stratum (NAS) protocol for 5G System (5GS); Stage 3 (Release 15)", 3GPP TS 24.501, V1.1.1, pp. 1-297, May 2018.
"Correction to MT SMS over NAS via non 3GPP access", Nokia, Nokia Shanghai Bell, S2-175497, SA WG2 Meeting #122bis, Aug. 21-25, 2017, pp. 1-2, Sophia Antipolis, France.
"3rd Generation Partnership Project; Technical Specification Group Core Network and Terminals; Non-Access-Stratum (NAS) protocol for 5G System (5GS); Stage 3 (Release 15)", 3GPP TS 24.501, V1.0.0, Mar. 2018, pp. 1-253.
International Search Report for PCT/JP2019/009382 dated May 28, 2019 (PCT/ISA/210).
Written Opinion for PCT/JP2019/009382 dated May 28, 2019 (PCT/ISA/237).

\* cited by examiner

PROCEDURE TO DELIVER SMS TO MOBILE DEVICE

CROSS REFERENCE TO RELATED APPLICATIONS

This application is a National Stage of International Application No. PCT/JP2019/009382 filed Mar. 8, 2019, claiming priority based on Indian Patent Application No. 201811018749 filed May 18, 2018, the disclosure of which is incorporated herein in its entirety by reference.

TECHNICAL FIELD

This disclosure is related to a procedure of selecting an access stratum to send MT SMS when the UE is registered to the core network via more than one access network.

BACKGROUND ART

In 5GS both 3GPP access and Non-3GPP access (e.g. WLAN) may be connected to one AMF. A UE can be connected to same PLMN via 3GPP access and non-3GPP access simultaneously or the UE can be connected to different PLMNs via 3GPP access and non-3GPP access simultaneously. The UE and the network maintain separate Registration Management context and CM state for a 3GPP access and a non-3GPP access.

In case the UE is connected to the same PLMN via 3GPP access and non-3GPP access then the UE is connected to a same AMF via 3GPP access and non-3GPP access. The AMF allocates single 5G-GUTI as a temporary identifier for both RM contexts. The UE will use the same 5G-GUTI to communicate via 3GPP access and non-3GPP access. If the UE wants to send and receive SMS it will indicate SMS support over NAS to the AMF. The AMF selects SMSF for the MO (Mobile Originated) and MT (Mobile Terminated) SMS transmission. The SMSF registers itself to a UDM (Unified Data Management) for the UE for SMS transmission over NAS. In case of MT SMS transmission the SMSF entity sends SMS to the AMF. If the UE is registered to the AMF via both 3GPP access and non-3GPP access, then how SMS is transmitted over 3GPP or non-3GPP access, i.e. which access is used for the SMS transmission depends on the operator policy. This SMS transmission mechanism brings the issue as described in the Problem statement 1.

When a UE is registered via 3GPP and non-3GPP access to two PLMNs which are not equivalent PLMNs then the UE is registered to two different AMFs via 3GPP access and non 3GPP access i.e. UE is registered to one AMF of a PLMN via 3GPP access and another AMF of the second PLMN via non-3GPP access. If the UE has requested during registration procedure to enable SMS service to both PLMNs then the SMSF entity of each PLMN registered to the UDM for SMS service of a UE. When the MT SMS comes to a GMSC (Gateway Mobile Switching Center) then the GMSC query routing information from UDM and the UDM sends the SMSF address registered in the UDM for the UE to the GMSC. The GMSC then forwards the MT SMS to the SMSF corresponding to the SMSF address received from the UDM. If the SMS delivery is not successful then the SMSF indicates this to GMSC. The GMSC shall try to deliver the SMS through another SMSF NF which address is provided to the GMSC by the UDM. This SMS transmission mechanism brings Problem Statement 2.

SUMMARY OF INVENTION

Technical Problem

Problem Statement 1:

The UE is registered for SMS over NAS transmission via 3GPP and non-3GPP access to a same AMF of a PLMN. When an MT SMS arrives in the AMF then the AMF transmits the SMS to the UE via 3GPP access or non-3GPP access depending on the operator policy. Therefore AMF may transmit SMS via 3GPP access even if the UE is in CM-CONNECTED state via non-3GPP access and CM-IDLE via 3GPP access. In the same way, the AMF may transmit SMS via 3GPP access even if the UE is in CM-CONNECTED state with RRC-INACTIVE over 3GPP access and CM-IDLE via 3GPP access. In such cases, The SMS transmission via 3GPP access needs to perform core network paging procedure or RAN paging procedure. This will consume network resources. In case the UE is not in coverage of 3GPP access then the paging procedure will fail and this will lead to failure in the MT SMS transmission. On the other hand, the SMS can be transmitted over non-3GPP access as it is in CM-CONNECTED state even when the UE is in CM-IDLE or CM-CONNECTED with RRC-INACTIVE via 3GPP access.

Problem Statement 2:

A UE has been registered to two different PLMNs one via 3GPP access and one via non-3GPP access and SMS service has been registered successfully in both PLMNs for the UE. The UE is in CM CONNECTED state over non-3GPP access and CM IDLE state or CM CONNECTED with RRC inactive indication over 3GPP access. Then the SMS can be delivered via either two PLMNs. If the SMS is delivered via the PLMN to which the UE is connected via 3GPP access and the UE is in CM-IDLE or CM-CONNECTED with RRC inactive indication, then the AMF needs to initiate paging procedure first and then after the NAS signaling connection is established i.e. the UE and the AMF moves to CM-CONNECTED state then the SMS will be transmitted in a NAS message from the network to the UE. This procedure will bring following overheads.

1. Paging will consume network resources.
2. In case the UE is not reachable due to out of coverage of 3GPP access then NAS signaling connection cannot be established and MT SMS transfer fails.
3. In addition if UE is in a Non-Allowed Area for the SMS service over the 3GPP access, then the SMS MT must be suspended till UE moves out from the Non-Allowed Area.

Solution to Problem

A method for communication in an AMF according to a first exemplary aspect of the present disclosure includes receiving an MT SMS message from a SMSF to transmit to the UE, and transmitting a SMS via a non-3GPP access using the SMS over a NAS procedure to transmit a MT SMS when the UE is in 5GMM-IDLE mode over a 3GPP access and 5GMM-CONNECTED mode via the non-3GPP access.

DESCRIPTION OF EMBODIMENTS

Abbreviations

Figure 1:
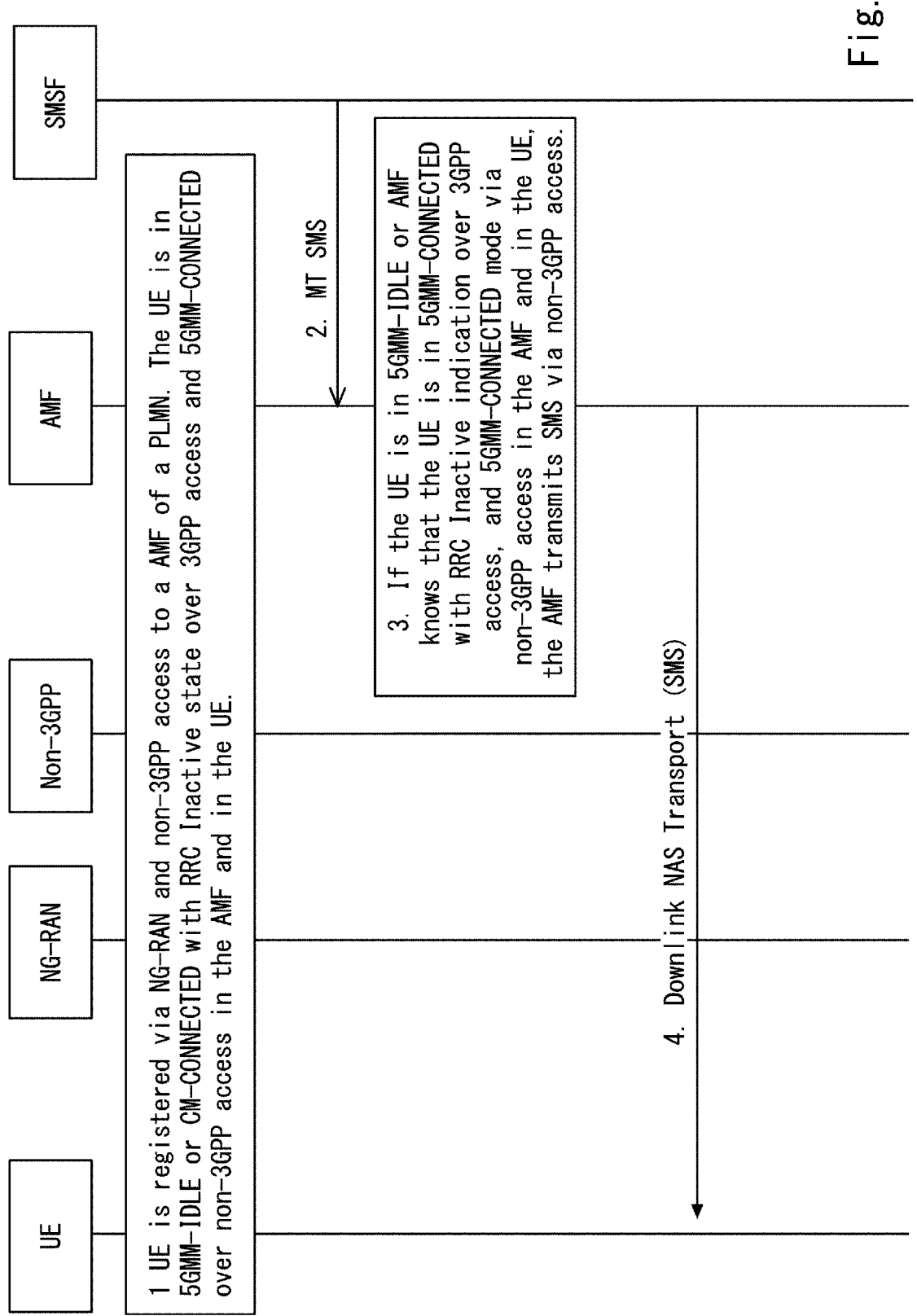
FIG. 1 shows MT SMS transmission procedure of solution 1.

For the purposes of the present document, the abbreviations given in TR 21.905 and the following apply. An abbreviation defined in the present document takes precedence over the definition of the same abbreviation, if any, in TR 21.905.

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
CM Connection Management
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GMSC Gateway Mobile Switching Center
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
MNRF Mobile Station Not Reachable Flag
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDM Unified Data Management
UDR Unified Data Repository
URSP UE Route Selection Policy
SMS Short Message Service
SMSF SMS Function
MO Mobile Originated
MT Mobile Terminated
MICO Mobile Initiated Connection Only (MICO)
Definitions For the purposes of the present document, the terms and definitions given in 3GPP TR 21.905, 3GPP TS 24.501 and the following apply. A term defined in the present document takes precedence over the definition of the same term, if any, in 3GPP TR 21.905 and in 3GPP TS 24.501.

First Embodiment (Solution 1 Solves Problematic Statement 1)

AMF transmits SMS via non-3GPP access if the UE is in CM-CONNECTED via non-3GPP access and CM-IDLE or CM-CONNECTED with RRC Inactive indication via 3GPP access.

The outline of this solutions are mentioned below.

The UE has been registered via 3GPP access and non-3GPP access to an AMF of a PLMN. In the step, the UE is in 5GMM-IDLE mode over 3GPP access or 5GMM-CONNECTED mode with RRC Inactive indication over a 3GPP access. In addition, the UE is in 5GMM-CONNECTED mode over non-3GPP access. The UE is also registered to transmit and receive SMS message over NAS in the AMF via both 3GPP access and non-3GPP access.

The AMF receives an MT SMS message from SMSF to transmit to the UE. If the UE is in 5GMM-IDLE mode over 3GPP access and 5GMM-CONNECTED mode via non-3GPP access in the AMF, then the AMF transmits SMS via non-3GPP access using SMS over NAS procedure to transmit MT SMS. In an another scenario, if the AMF is aware that the UE is in 5GMM-CONNECTED mode with RRC Inactive indication over 3GPP access and the UE is in 5GMM-CONNECTED mode via non-3GPP access in the AMF, then the AMF transmits SMS via non-3GPP access using SMS over NAS procedure to transmit MT SMS. The above determination of the SMS transmission via non 3GPP access may be performed priority over the determination using the operator priority. In another case, the above determination of the SMS transmission via non-3GPP access is one option in operator policy and this option is a highest priority option i.e. it is executed first before any other option in the operator policy. In the above scenario the UE is a delay tolerant UE for example it registered to the AMF via 3GPP access and longer DRX (Discontinuous Reception) cycle (extended DRX) has been negotiated between the UE and the AMF for the 3GPP access or the UE is in the Power Saving Mode (PSM) for the 3GPP access. The MICO mode is activated is activated over 3GPP access in the UE by the AMF and also supports non-3GPP access and non-3GPP related procedures. The SMS is sent in the DL NAS TRANSPORT message to the UE via non-3GPP access, an existing NAS message or a new NAS message.

The steps of the procedure as shown in FIG. 1 is described in detail as below.

1. The UE has been registered via 3GPP access and non-3GPP access to an AMF of a PLMN. In the step, the UE is in 5GMM-IDLE mode over 3GPP access or 5GMM-CONNECTED mode with RRC Inactive indication over a 3GPP access. In addition, the UE is in 5GMM-CONNECTED mode over non-3GPP access. The UE is also registered to transmit and receive SMS over NAS in the AMF via both 3GPP access and non-3GPP access.

2. The AMF receives an MT SMS from SMSF to transmit to the UE.

3. If the UE is in 5GMM-IDLE mode over 3GPP access in the 3GPP access and 5GMM-CONNECTED mode via non-3GPP access in the AMF, then the AMF transmits SMS via non-3GPP access using SMS over NAS procedure to transmit MT SMS. In an another scenario, if the AMF is aware that the UE is in 5GMM-CONNECTED mode with RRC Inactive indication over 3GPP access and the UE is in 5GMM-CONNECTED mode via non-3GPP access in the AMF, then the AMF transmits SMS via non-3GPP access using SMS over NAS procedure to transmit MT SMS. The above determination of the SMS transmission via non 3GPP access may be performed priority over the determination using the operator priority. In another case, the above determination of the SMS transmission via non-3GPP access is one option in operator policy and this option is a highest priority option i.e. it is executed first before any other option in the operator policy. In the above scenario the UE is a delay tolerant UE for example it registered to the AMF via 3GPP access and longer DRX cycle (extended DRX) has been negotiated between the UE and the AMF for the 3GPP access or the UE is in the Power Saving Mode (PSM) for the 3GPP access. The MICO mode is activated is activated over 3GPP access in the UE by the AMF and also supports non-3GPP access and non-3GPP related procedures.

4. Based on the decision in step 3, the SMS is sent in the DL NAS TRANSPORT message to the UE via non-3GPP access. The SMS may be transferred in an existing NAS message or a new NAS message.

Second Embodiment (Solution 2 Solves Problematic Statement 2)

A UDM sends a list of SMSF addresses in priority order to the SMS-GMSC in case the UDM has more than one SMSF address to transfer an SMS message to a UE. In case a UE is in CM-CONNECTED mode over non-3GPP access in first PLMN and CM-IDLE over 3GPP access in second PLMN then the UDM will set the SMSF address of the first PLMN higher priority than the SMSF address of the second PLMN.

The outline of the solution 2 is given below.

UE has registered to a AMF 1 of PLMN 1 via a non-3GPP access and to a AMF 2 via 3GPP access for a SMS service. The UE is registered to SMSF 1 and SMSF 2 for a SMS service. The UE is in 5GMM-IDLE mode via 3GPP access or 5GMM-CONNECTED with RRC Inactive indication over 3GPP access and 5GMM-CONNECTED state via non-3GPP access.

The AMF updates the UDM about the UE N1 signaling connection state over an access network (3GPP access or non-3GPP access) when the UE establishes N1 NAS signaling connection or releases N1 NAS signaling connection over the access network.

The MT SMS arrives in the SC. The SC forwards the MT SMS to the SMS-GMSC.

The SMS-GMSC sends request to the UDM to send Routing info for SMS.

The UDM sends SMSF addresses of SMSF 1 and SMSF 2 and a separate information element SMS transmission priority order. The SMS transmission priority order indicates to the SMS-GMSC the priority order of SMSF to be used to send an SMS message to the UE.

The SMS-GMSC on receiving the list of SMSF addresses, sends the SMS message to the highest priority SMSF. The SMSF then forwards the SMS message to the UE via AMF where the UE is currently registered.

The steps of solution 2 are described in details as below.

1. A UE has registered to an AMF 1 of PLMN 1 via a non-3GPP access and to an AMF 2 of PLMN 2 via 3GPP access for a SMS service. The UE is registered to SMSF 1 and SMSF 2 for a SMS service. The UE is in 5GMM-IDLE mode via 3GPP access or 5GMM-CONNECTED with RRC Inactive indication over 3GPP access and 5GMM-CONNECTED state via non-3GPP access.

2. The AMF updates the UDM about the UE N1 signaling connection state over an access network (3GPP access or non-3GPP access) when the UE establishes N1 NAS signaling connection or releases N1 NAS signaling connection over the access network.

3. The MT SMS arrives in the SC. The SC forwards the MT SMS to the GMSC.

4. The SMS-GMSC sends the Send Routing info for SMS request message to the UDM in order to find an appropriate routing path to deliver the SMS message to the UE.

5. The UDM sends the Send Routing info for SMS response message to the SMS-GMSC with SMSF addresses of SMSF 1 and SMSF 2 and a separate information element SMS delivery priority order. The SMS delivery priority order indicates to the SMS-GMSC the priority order of SMSF to be used to send an SMS message to the UE.

The Step 4 and step 5 can be realized that the GMSC sends Nudm_UECM_Get (SUPI, SMS) to the UDM and the UDM responds with Nudm_UECM_Get response (UE SMSF identities, UDM policy, SMS delivery priority order).

Figure 2:
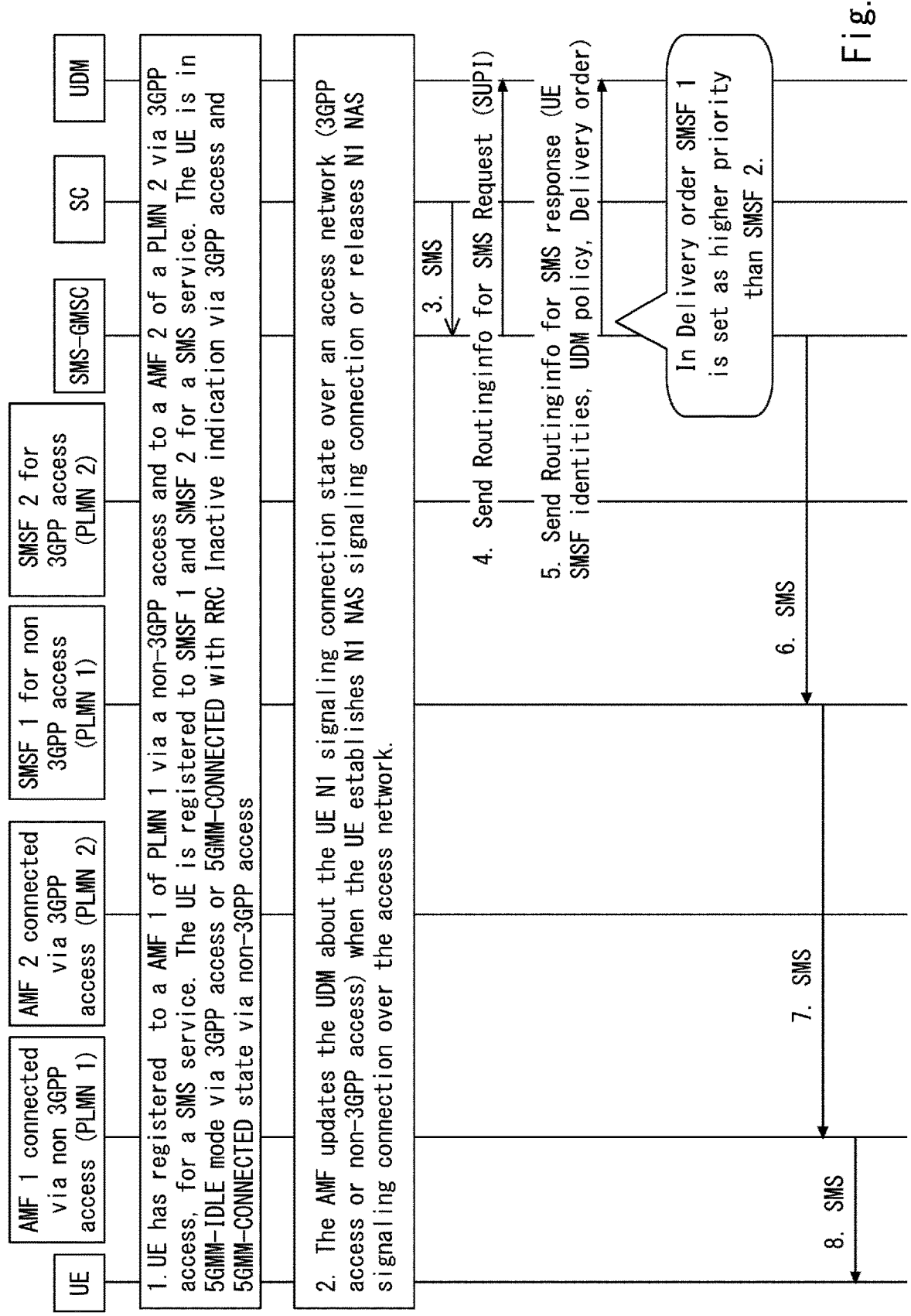
FIG. 2 shows procedure to transfer MT SMS for solution 2.

In the case shown in FIG. 2, the SMSF 1 is given first priority to deliver an SMS message and SMSF 2 is given second priority.

In another scenario the each entry in SMSF address list contains an information element indicating priority.

In another scenario the SMSF address list contains SMSF addresses in priority order with highest priority SMSF address is first in the list.

6. The SMS-GMSC on receiving the list of SMSF addresses and SMS delivery priority order, sends the SMS to the highest priority SMSF. In the scenario shown in FIG. 2 the SMS-GMSC sends the SMS message to SMSF 1 first.

7. The SMSF on receiving the SMS message from SMSF forwards the SMS message to the AMF to which the UE is registered for SMS.

8. The AMF forwards the SMS message to the UE.

In the scenario shown in FIG. 2 the SMSF 1 sends SMS message to the AMF 1 which then forwards the SMS message to the UE via non-3GPP access network.

The term "UE" is generally intended to be synonymous with the term mobile station, mobile device, wireless device, and includes standalone mobile stations, such as terminals, cell phones, smart phones, tablets, cellular IoT devices, IoT devices, machinery. The term "UE" is also UE that is used by 3GPP.

A UE may be an equipment for production, energy related machinery (such as boilers, engines, turbines, solar panel, wind turbines, hydroelectric generator, thermal power generator, nuclear electricity generator, batteries, nuclear systems and equipment, heavy electrical machinery, pumps, compressors, vacuum pumps, fans, blowers, oil hydraulic equipment, pneumatic equipment, metal working machinery, manipulators, robots and their application systems, tools, molds and dies, rolls, conveying, elevating, materials handling equipment and their application systems, textile machinery, sewing machine, printing and related machinery, paper converting machinery, chemical machinery, mining and construction machinery and equipment, machinery and implements for agriculture, forestry and fisheries, safety and environment preservation equipment, tractor, construction machine, precision bearings, chains, gear, power transmission, lubricating equipment, valve, pipe fitting, etc.)

A UE may be a transport equipment (such as rolling stocks, motor vehicle, motor cycle, bicycle, train, bus, carts, rickshaw, ship and watercraft, aircraft, rocket, satellite, drone, balloon, etc.)

A UE may be an information and communication equipment (such as electronic computer and related equipment, communication and related equipment, electronic component, etc.)

A UE may be a refrigerating machine, a refrigerating machine applied product, trade and service industry equipment, vending machine, automatic service machine, office machine and equipment, consumer electronic and electronic appliance (such as audio equipment, video equipment, loud speaker, radio, television, microwave oven, rice cooker, coffee machine, dishwasher, washing machine, dryer, electronic fans and related appliance, cleaner, etc.)

A UE may be an electrical application system (such as x-ray system, particle accelerator, radio isotope equipment, sonic equipment, electromagnetic application equipment, electronic power application equipment, etc.).

A UE may be an electronic lamp, luminaire, measuring instrument, analyzer, tester and surveying instrument (such as smoke alarm, human alarm sensor, motion sensor, wireless tag, etc.), watches and clock, laboratory instrument, optical apparatus, medical equipment and system, weapon, cutlery, hand tool.

A UE may be a wireless-equipped personal digital assistants (such as wireless cards or modules that are designed for attachment to or insertion into another electronic device (for example a personal computer, electrical measuring machine).

A UE may be a device or a part of system that provides applications, services, and solutions described below, as to "internet of things (IoT)", using a variety of wired and/or wireless communication technologies.

Applications, services, and solutions may be MVNO (Mobile Virtual Network Operator) service, emergency radio communication system, PBX (Private Branch eXchange) system, PHS/Digital Cordless Telecommunications system, POS system, advertise calling system, MBMS (Multimedia Broadcast and Multicast Service), V2X (Vehicle to Everything) system, train radio system, location related service, Disaster/Emergency Wireless Communication Service, community service, video streaming service, femto cell application service, VoLTE service, charging service, radio on demand service, roaming service, activity monitoring service, telecom carrier/communication NW selection service, functional restriction service, PoC (Proof of Concept) service, personal information management service, ad hoc network/DTN (Delay Tolerant Networking) service, etc.

Further, the above-described UE are merely examples of applications of the technical ideas obtained by the inventor. Needless to say, these technical ideas are not limited to the above-described UE and various modifications can be made thereto.

AS (Access Stratum) layer may include an RRC layer, a SADP layer, a PDCP layer, a RLC layer, a MAC layer and PHY layer.

NG-RAN may include an eNB (evolved E-UTRAN) connected with 5GC and gNB.

User Equipment (UE)

Figure 3:
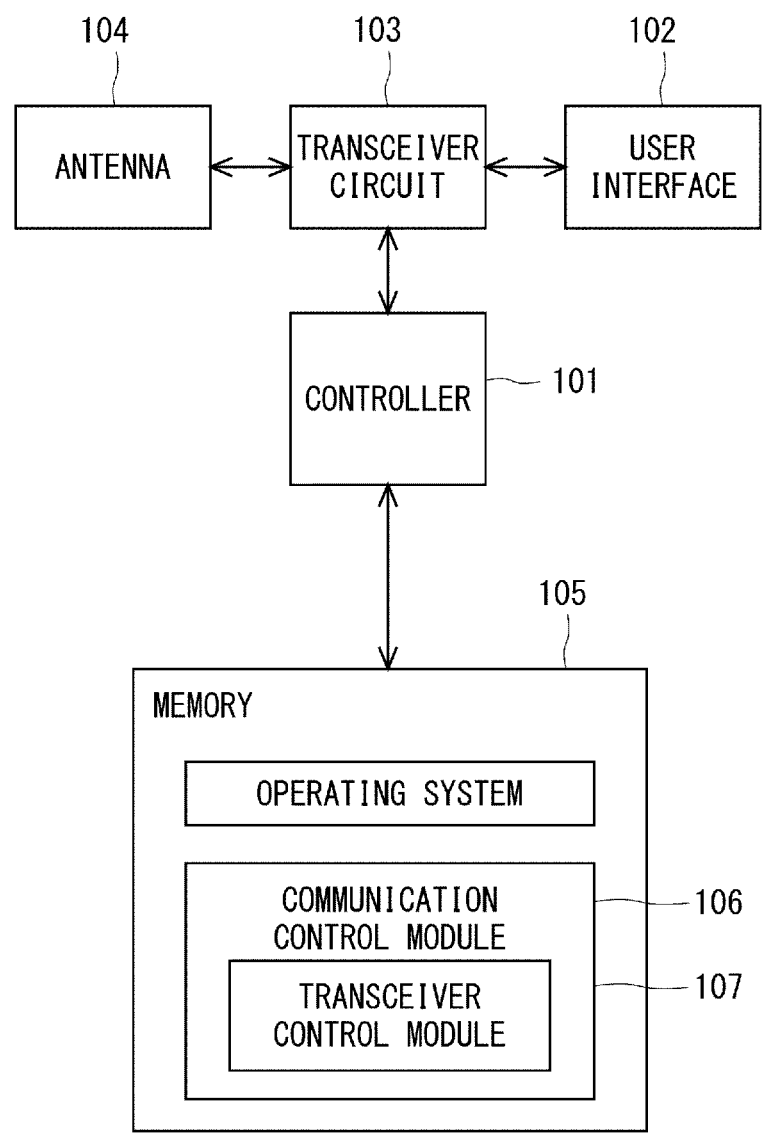
FIG. 3 shows a bock diagram for UE.

FIG. 3 is a block diagram illustrating the main components of the UE. As shown, the UE (100) includes a transceiver circuit (103) which is operable to transmit signals to and to receive signals from the connected node(s) via one or more antenna (104). Although not necessarily shown in FIG. 3, the UE will of course have all the usual functionality of a conventional mobile device (such as a user interface (102)) and this may be provided by any one or any combination of hardware, software and firmware, as appropriate. Software may be pre-installed in the memory and/or may be downloaded via the telecommunication network or from a removable data storage device (RMD), for example.

A controller (101) controls the operation of the UE in accordance with software stored in a memory (105). The software includes, among other things, an operating system and a communications control module (106) having at least a transceiver control module (107). The communications control module (106) (using its transceiver control submodule) is responsible for handling (generating/sending/receiving) signalling and uplink/downlink data packets between the UE and other nodes, such as the base station/(R)AN node, the MME, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update) etc. Such signalling may also include, for example, broadcast information (e.g. Master Information and System information) in a receiving case.

(R)AN Node

Figure 4:
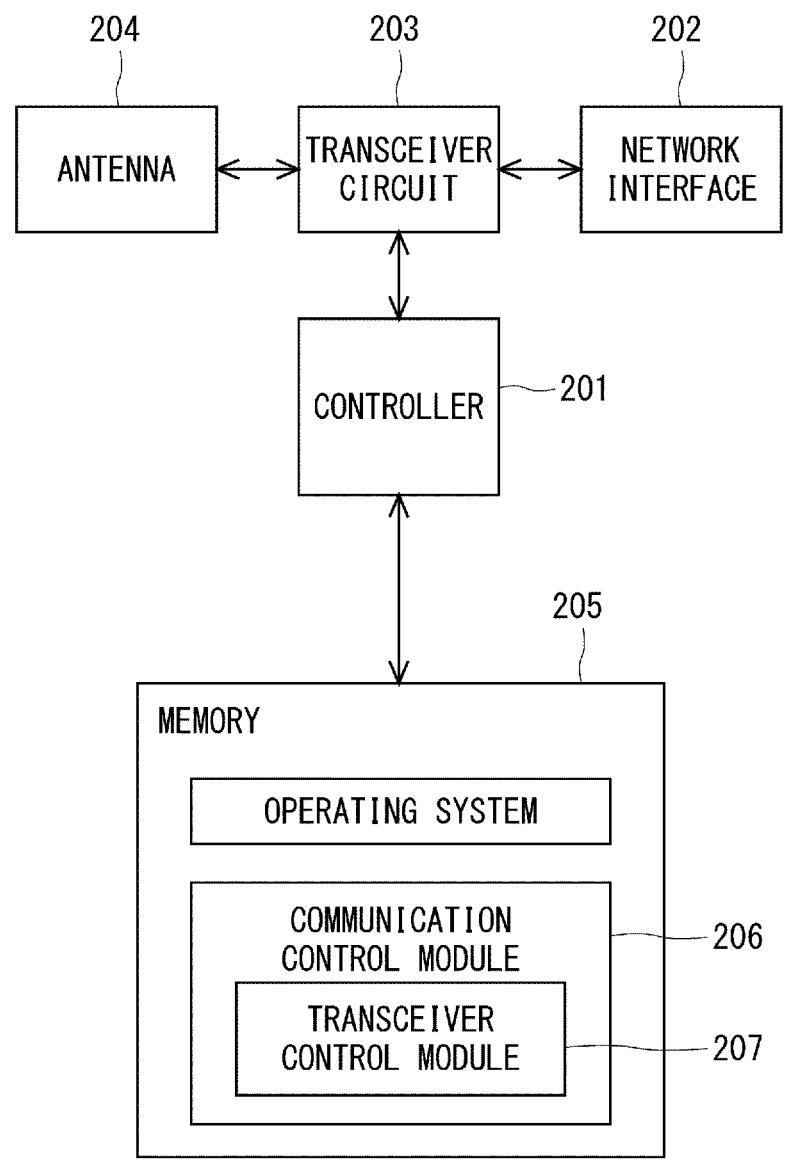
FIG. 4 shows a bock diagram for (R)AN node.

FIG. 4 is a block diagram illustrating the main components of an exemplary (R)AN node (200). The (R)AN node (200) includes 3GPP Access Node and Non 3GPP Access Node. The 3GPP Access Node may be, a base station ('eNB' in LTE, 'gNB' in 5G). As shown, the (R)AN node (200) includes a transceiver circuit (203) which is operable to transmit signals to and to receive signals from connected UE(s) via one or more antenna (204) and to transmit signals to and to receive signals from other network nodes (either directly or indirectly) via a network interface (202). A controller (201) controls the operation of the (R)AN node in accordance with software stored in a memory (205). Software may be pre-installed in the memory and/or may be downloaded via the telecommunication network or from a removable data storage device (RMD), for example. The software includes, among other things, an operating system and a communications control module (206) having at least a transceiver control module (207).

The communications control module (206) (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1AP messages and NG AP messages (i.e. messages by N2 reference point), messages by Y2 reference point, etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

AMF

Figure 5:
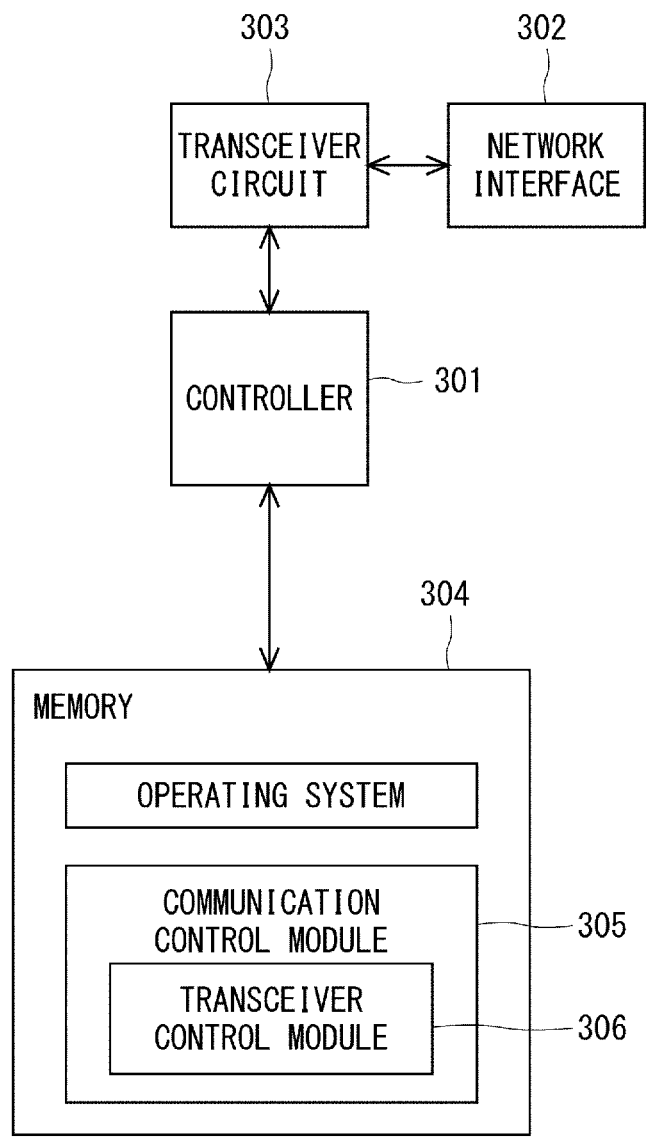
FIG. 5 shows a bock diagram for AMF.

FIG. 5 is a block diagram illustrating the main components of the AMF (300). The AMF (300) is included in the 5GC. As shown, the AMF (300) includes a transceiver circuit (303) which is operable to transmit signals to and to receive signals from other nodes (including the UE) via a network interface (302). A controller (301) controls the operation of the AMF (300) in accordance with software stored in a memory (304). Software may be pre-installed in the memory (304) and/or may be downloaded via the telecommunication network or from a removable data storage device (RMD), for example. The software includes, among other things, an operating system and a communications control module (305) having at least a transceiver control module (306).

The communications control module (using its transceiver control sub-module) is responsible for handling (generating/sending/receiving) signalling between the AMF and other nodes, such as the UE, base station/(R)AN node (e.g. "EUTRAN Node" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

REFERENCE SIGNS LIST

100 UE
101 controller
102 user interface
103 transceiver circuit
104 antenna
105 memory
106 control module
107 transceiver control module
200 (R)AN node
201 controller
202 network interface
203 transceiver circuit
204 antenna
205 memory
206 communications control module
207 transceiver control module
300 AMF
301 controller
302 network interface
303 transceiver circuit
304 memory
305 communications control module
306 transceiver control module

The invention claimed is:

1. A method for communication in an Access and Mobility Management Function (AMF), the method comprising;
receiving a Mobile Terminated Short Message Service (MT SMS) message from a Short Message Service Function (SMSF) to transmit to the User Equipment (UE);
transmitting a Short Message Service (SMS) via a non-3rd Generation Partnership Project (3GPP) access using the SMS over a Non-Access Stratum (NAS) procedure to transmit a MT SMS in response to the AMF determining that the UE is in 5th generation Mobility Management (5GMM)-IDLE mode over a 3GPP access and 5GMM-CONNECTED mode via the non-3GPP access; and
transmitting, in response to the AMF determining that the UE is in 5GMM-CONNECTED mode with a Radio Resource Control (RRC) Inactive indication over the 3GPP access and that the UE is in 5GMM-CONNECTED mode via the non-3GPP access in the AMF, the SMS via the non-3GPP access using the SMS over NAS procedure to transmit the MT SMS.

2. The method according to claim 1, wherein the SMS transmission via non-3GPP access is performed with priority over operator policy.

3. A method for communication in a User Equipment (UE), the method comprising:
performing registration to an Access and Mobility Management Function (AMF) via a non-3rd Generation Partnership Project (3GPP) access and a 3GPP access; and
receiving a Short Message Service (SMS) via the non-3GPP access using the SMS over a Non-Access Stratum (NAS) procedure to receive a Mobile Terminated Short Message Service (MT SMS) message in a case where the UE is in 5th generation Mobility Management (5GMM)-IDLE mode over the 3GPP access and 5GMM-CONNECTED mode via the non-3GPP access,
wherein the UE is in a Mobile Initiated Connection Only (MICO) mode over the 3GPP access, and
wherein the SMS over NAS procedure is used to transfer the MT SMS message from a Short Message Service Function (SMSF) to the UE.

4. The method according to claim 3, wherein the receiving the SMS via non-3GPP access is performed with priority over operator policy.

* * * * *